Feb. 9, 1943.  C. D. PETERSON ET AL  2,310,310

TRANSMISSION GEARING

Filed Feb. 8, 1940  2 Sheets-Sheet 1

INVENTORS.
Carl D. Peterson + Elmer J. Barth
BY
Budell & Thompson
ATTORNEYS.

Feb. 9, 1943.  C. D. PETERSON ET AL  2,310,310
TRANSMISSION GEARING
Filed Feb. 8, 1940   2 Sheets-Sheet 2

INVENTORS
Carl D. Peterson + Elmer J. Buth
BY
Burdell S. Thompson
ATTORNEYS.

Patented Feb. 9, 1943

2,310,310

UNITED STATES PATENT OFFICE 2,310,310

TRANSMISSION GEARING

Carl D. Peterson and Elmer J. Barth, Toledo, Ohio, assignors to Spicer Manufacturing Corporation, Toledo, Ohio, a corporation of Virginia Application February 8, 1940, Serial No. 317,906

1 Claim. (Cl. 74—333)

This invention relates to change-speed transmission gearing, and has for its object a gear shifting mechanism and the arrangement thereof relative to the shiftable elements of a gear set which effects a larger number of shifts, as five speeds forward and reverse than in a gearing with a less number of shifts, as three or four speeds forward and reverse, both in the same size conventional or standard three or four speed forward gear box, which gear shifting mechanism or the selecting and shifting lever thereof has the same operating movement as in conventional gear sets.

It also has for its object a compact arrangement of the motion transmitting means, as the shift rods, between the gear shifting lever and the shiftable elements or clutches having the conventional movements, or a gear shift for a change-speed gearing having, for instance, five speeds forward and reverse and located in a gear box substantially the length of a gear set having three or four speeds forward and reverse, in which the gear shifting mechanism or shift rods are mounted in a cover of the size substantially that of the cover for a three or four speed forward gear box and the selecting and shifting lever has the conventional movements. Usually, the handle end of the gear shifting lever is pulled rearwardly for first speed forward; also forward from neutral in another path for second speed, and rearward for direct drive. By "conventional movements" is meant the same movements, with direct drive effected in for instance a five speed transmission by the rearward movement of the handle end of the gear shifting lever and a forward movement for fourth speed forward, although in some instances, direct drive may be fourth speed, as when one of the indirect drives is an over-drive. In all cases, direct drive is effected through the conventional rearward movement of the handle end of the gear shifting lever and first and reverse through a rearward and forward movement of the handle end of the shifting lever.

The invention further has for its object a shifting mechanism embodying at least three shift rods, a selecting and shifting lever having a lateral selecting movement to select any one of the rods, and a fore-and-aft shifting movement, one of these rods being shiftable in opposite directions from neutral to effect direct drive and one of the indirect drives, an additional rod operated by the latter rod with motion transmitting and reversing means between the two last-mentioned rods, in order to bring about the gear shifts with the conventional movements of the handle end of the gear shifting lever.

The invention consists in the novel features and in the combinations and constructions hereinafter set forth and claimed.

In describing this invention, reference is had to the accompanying drawings, in which like characters designate corresponding parts in all the views.

Figures 1, 2:
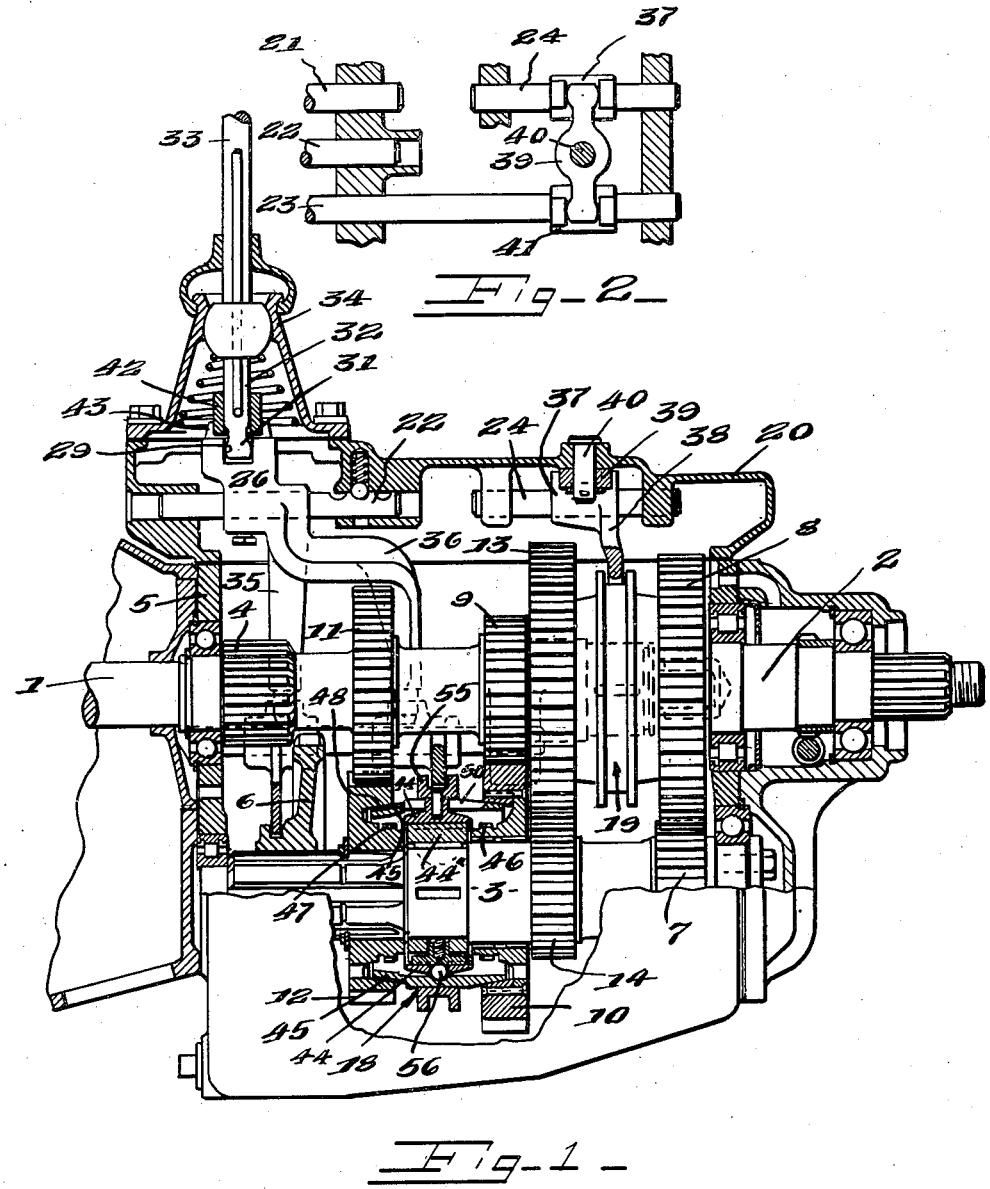
Figure 1 is a longitudinal sectional view of a transmission gearing or set having five speeds forward and a reverse.
Figure 2 is a fragmentary plan view of a portion of the shifting mechanism.

The gearing here illustrated comprises, generally, an input shaft 1, an output shaft 2 journalled in axial alinement in the gear box, a countershaft 3 journalled in the gear box, and trains of gears between the input shaft 1 and the output shaft 2 through gears on the counter shaft. The trains of gears for effecting first speed consists of a gear 4 on the input shaft 1 adjacent the front end wall of the gear box 5, a gear 6 being splined to the countershaft 3 and a final drive train of gears between the countershaft and output shaft 2 consisting of gears 7 and 8 keyed or splined to or integral with the countershaft 3 and the output shaft 2 and located adjacent the rear wall of the gear box 5. The second speed forward train consists of intermeshing gears 9 and 10 on the input shaft 1 and countershaft 3 respectively, and the final drive train of gears 7 and 8. Third speed forward is effected through intermeshing gears 11 and 12 on the input shaft 1 and countershaft 3 respectively and the final drive train. Fourth speed is effected through intermeshing gears 13 and 14 on the input shaft 1 and the countershaft 3 respectively and the final drive train of gears 7, 8. Fifth speed or direct drive is effected through clutching the shafts 1, 2 directly together.

Figures 3, 4:
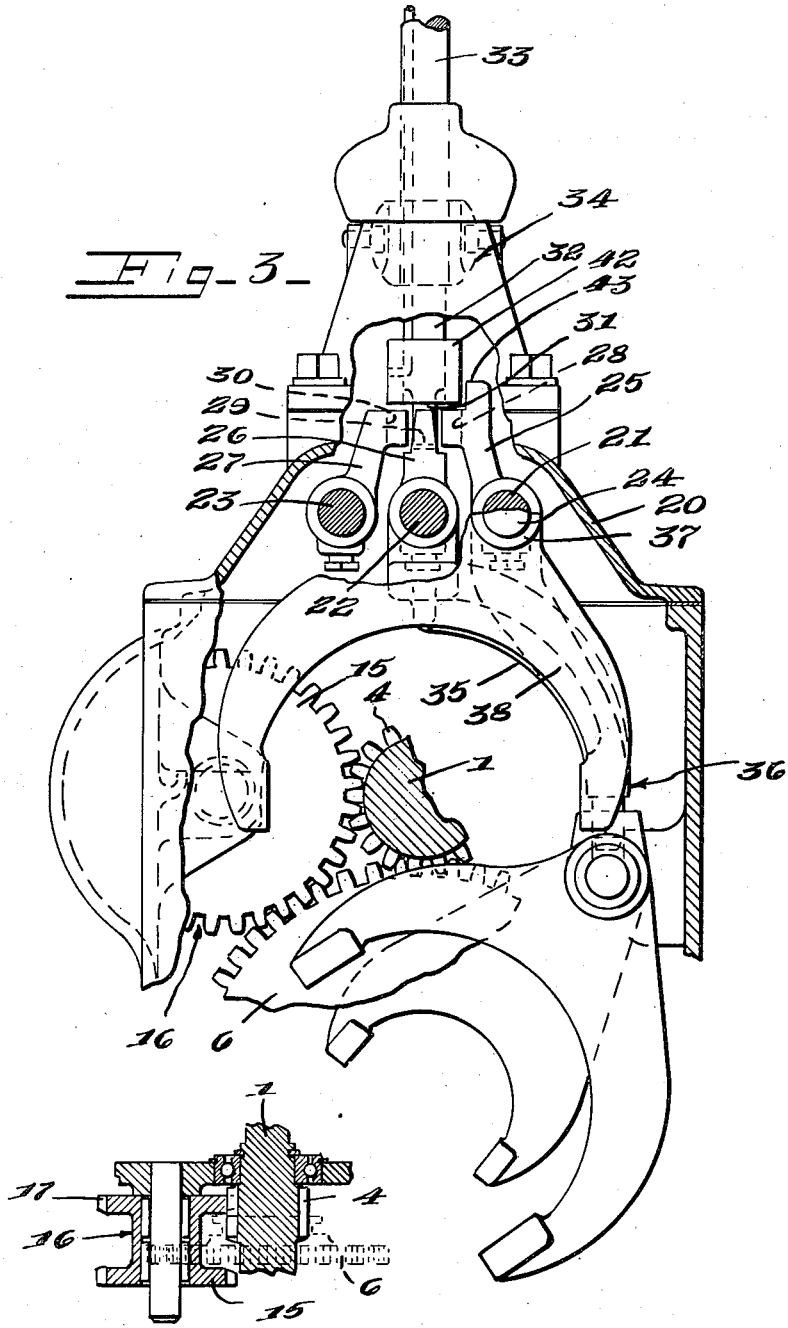
Figure 3 is a fragmentary elevation, partly in section and parts being omitted, looking to the left in Figure 1.
Figure 4 is a detail view of the reverse gearing.

The gear 6 through which first speed forward is obtained, is normally out of mesh with the gear 4 and is shiftable in one direction, as to the left (Figure 1) into mash with the gear 4 in the opposite direction, or to the right from neutral, into mesh with a gear 15 (Figure 4) of a reverse spool 16, the other gear 17 of the spool meshing with the gear 4. The reverse gearing per se, forms no part of this invention. The gears 9 and 11 of the second and third speeds forward are, in the illustrated embodiment of this gearing, fixed or keyed to the input shaft 1 and the companion gears 10, 12 on the countershaft are loosely or rotatably mounted on the countershaft and clutchable thereto by a double synchronizing clutch 18, the clutch being located between the gears 10 and 12 and shiftable in one direction from neutral, as to the right, to clutch the gear 10 to the countershaft 3, and in the opposite direction, as to the left, to clutch the gear 12 to the countershaft 3.

In this embodiment of this five speed transmission gearing, the gear 13 is loosely or rotatably mounted on the input shaft 1 and the gear 14 fixed to or formed integral with the countershaft 3 and the gear 13 is clutched to the shaft 1 by a synchronizing clutch 19 shiftable in one direction from neutral, as to the left, to clutch the gear 13 to the input shaft 1 and in the opposite direction from neutral to clutch the shafts 1, 2 together in direct drive relation. The input shaft 1 extends more than half the distance between the front and rear walls of the gear box instead of being a stem gear, while the output shaft and the gear 8 thereon are a stem gear, and hence, the gear trains effecting first, second and third speeds forward and reverse are located in the front portion of the gear box, and the fourth and fifth trains located in the rear portion of the gear box, and this gear box is approximately the same axial length as the conventional gear box for a three or four speed forward and reverse gear set of equal torque capacity.

20 designates the cover for the gear box which carries the gear shifting mechanism, this cover being substituted for the cover of a conventional gear box.

The gear shifting mechanism comprises shift rods 21, 22 and 23 mounted in suitable guide passages in the cover 20, an additional shift rod 24 also mounted in the cover with motion transmitting and reversing means between one of the former rods and the rod 24. The rods 21, 22, 23 have suitable blocks or arms 25, 26 and 27 thereon having notches at 28, 29 and 30 therein, normally arranged in alinement for coacting with the finger 31 at the end of the lower arm 32 of the gear shifting lever 33, this lever being mounted in a tower 34 on the cover to have a lateral selecting and a fore-and-aft shifting movement. The blocks 25, 26 are provided with suitable forks 35 and 36 respectively for shifting the first speed forward and reverse gear 6 and clutch 18. The additional rod 24 is provided with a block 37 having a fork 38 coacting with the clutch 19. In the illustrated embodiment of this invention, the shift rod 23 is longer than, or extends beyond, the ends of the rods 21, 22 and the rod 24 is alined with the first and reverse shift rod 21. The motion transmitting and reversing means between the longer rod 23 and the additional rod 24 is here shown as a lever 39 pivoted at 40 between its ends to the cover 20, one arm thereof coacting with a block 41 on the longer shift rod 23 and the other arm coacting with the block 37.

In operation, lateral movement of the gear shifting lever to select the first speed and reverse rod 21 moves the finger 31 into the notch of the block 25 and a rearward movement of the upper or handle end of the gear shifting lever 33 moves the finger 31 forwardly, shifting the gear 6 into mesh with the gear 4, or movement of the handle end of the rod forwardly, when in this selected position, moves the finger 31 rearwardly, shifting the gear 6 into mesh with the reverse spool gear 15. Incidentally in selecting the rod 21, it is necessary to operate a locking device, as a sleeve 42 upwardly on the gear shifting lever to clear a shoulder 43 on the block 25 of the first and reverse shift rod 21.

The gear shifting lever normally stands with the finger 31 in the slot of the block 26 of the intermediate shift rod 22. Movement forwardly of the handle end of the gear shifting lever 33 shifts the finger 31 rearwardly, which carries the block 26, causing the clutch 18 to clutch the gear 10 to the countershaft 3 to effect second speed forward. Movement of the handle end of the gear shifting lever rearward, when the finger 31 is in neutral, causes the fork 36 to operate the clutch 18 to clutch the gear 12 to the countershaft, effecting third speed forward. Movement of the handle end of the gear shifting lever 33 laterally or to the right (Figure 3) causes the finger 31 to select the block 27 of the long shift rod 23 and movement forwardly of the handle end of the shift rod causes the rod 23 to shift rearwardly and through the reversing lever 39 shifts the additional shift rod 24 forward, causing the clutch 19 to clutch the gear 13 to the input shaft 1 and rearward movement of the handle end of the lever 23, when in this selected position, moves the finger 31 and the rod 23 forward, and hence the additional rod 24 rearwardly through the reversing lever 39 operating the clutch 19 to the right (Figure 1) to clutch the input and output shafts 1, 2 together in direct drive relation. In the event the gears 13, 14 are of such ratio as to be an over-drive, the operator may first shift the gear shifting lever 33 rearward to clutch the shafts 1, 2 together in direct drive relation before again shifting forward into over drive. In any event, the movement of the gear shifting lever for first and reverse and second and third speeds are the same as in the conventional gear shifts, and also when in indirect drive, the same as in conventional gear shifts.

Owing to the construction of this gear shifting mechanism, it can be applied to a conventional gear box and maintain the same conventional movements of the gear shifting lever.

The clutches 18 and 19 are of the same construction and are synchronizing clutches including toothed sections and friction sections. 44 designates the toothed section, which is rotatable with the shaft 3 (or 1), it being shown as slidably splined on a collar 44ª rotatable with the shaft 3. 45 is a friction section, which is here shown as in the form of a sleeve slidably mounted on the toothed section 44. The toothed section is shiftable in opposite directions on the collar 44ª from neutral to interlock clutch teeth thereof with clutch teeth 46, 47 on the gears 10 and 12 respectively (or similar clutch teeth on the gears 8 and 13 respectively). The sleeve 45 is provided with conical ends, on each of which is mounted a friction ring or band, as the ring 48, of bronze, coacting with a complemental conical face on the gear 10 or 12 (or 8 or 13). The toothed section 44 is provided with radial posts extending through slots 50 in the sleeve on the ends of which post the shifting collar 55 is mounted. Also, yielding means, as spring-pressed poppets 56 couple the toothed section 44 and the friction or sleeve section 45 together, so that they shift axially as a unit until the speeds of the two parts to be clutched together are synchronized, when the toothed section can be shifted into engaged position relative to the sleeve.

The construction of the clutch per se forms no part of this invention.

Shifting force first applied to the fork 36 or 38 say to the left, first shifts the toothed section 44 and the sleeve 45 as a unit, bringing the friction face at one end of the sleeve into engagement with the complemental friction face of the gear with which it coacts, and thus effecting the synchronizing.

When the synchronizing takes place, the continued shifting pressure shifts the toothed section 44 into engaging position, the continued pressure overcoming the holding action of the spring-pressed poppets 56. Thus, all shifts, except first and reverse, are effected through compactly arranged synchronizing clutches.

Owing to the fact that the synchronizing clutches are located on different parallel shafts or specifically owing to the fact that the synchronizing clutch 18 is on the countershaft and the synchronizing clutch 19 coaxial with the input and output shafts, the entire transmission with the two synchronizing clutches is considerably, or several inches, shorter than with both mounted on the same shaft and the weight of the gear set considerably decreased over the conventional design and the cost correspondingly decreased over the conventional design, of the same number of gear shifts and torque capacity.

Owing to this arrangement of synchronizing clutches on different parallel shafts, the same conventional movements of the gear shifting mechanism are maintained through the arrangement of the shift rods including the rod 24, and motion transmitting and reversing lever between it and the extension of the rod 23.

What we claim is:

In a change speed transmission gearing, an input shaft, an output shaft alined therewith, and a countershaft, a gear mounted on and rotatable with the input shaft, second and third gears mounted on and rotatable with the input shaft, gears on the countershaft and rotatable about the same and clutchable thereto and meshing with the second and third gears on the input shaft respectively, a fourth gear loosely mounted on the input shaft and clutchable thereto, and meshing with a gear mounted on and rotatable with the countershaft, a final drive gear mounted on the output shaft and rotatable therewith and meshing with a gear rotatable with the countershaft, a clutch operable in opposite directions from neutral to alternately clutch the gears loosely mounted on the countershaft to the countershaft, a second clutch shiftable in opposite directions from neutral to alternately clutch the gear loosely mounted on the input shaft to the input shaft, and to clutch the input and output shafts directly together, an idler spool having one of its gears meshing with the first gear on the input shaft, a gear rotatable with the countershaft and normally out of mesh with the other gear of the spool and the first gear on the input shaft and shiftable in opposite directions from neutral to mesh with the first gear on the input shaft and the other gear of the reverse spool, and means for selecting and operating the shiftable gear and the clutches.

CARL D. PETERSON.
ELMER J. BARTH.